No. 691,210. Patented Jan. 14, 1902.
W. VENULETH.
APPARATUS FOR CONCENTRATING LIQUIDS.
(Application filed June 7, 1901.)

(No Model.)

UNITED STATES PATENT OFFICE.

WILHELM VENULETH, OF DARMSTADT, GERMANY.

APPARATUS FOR CONCENTRATING LIQUIDS.

SPECIFICATION forming part of Letters Patent No. 691,210, dated January 14, 1902.

Application filed June 7, 1901. Serial No. 63,599. (No model.)

*To all whom it may concern:*

Be it known that I, WILHELM VENULETH, director of the Actien Maschinenbau Anstalt, vormals Venuleth & Ellenberger, a subject of the German Emperor, residing at Darmstadt, Germany, have invented new and useful Improvements in or Relating to Apparatus for Use in the Concentration of Liquids, of which the following is a specification.

My invention relates to apparatus for use in the concentration of liquids.

The object of my invention consists in the arrangement of a hollow roller in a convenient receptacle, which is filled with the liquid to be concentrated, the roller, which is heated by steam, being constantly kept in rotation, while at any convenient point a scraper is pressed against the roller, so as to keep the latter constantly clean and to prevent the material from drying on the roller, and to allow a proper radiation of heat.

The present invention is distinguished from similar devices in which a scraper pressing against a roller is used by the fact that the liquids in said devices are introduced between two pairs of rollers and are drawn off from the circumference of the roller. Such arrangements, however, are only useful when the material to be concentrated is homogeneous and of a substantial consistency when delivered on the rollers, while according to the present invention any thin liquid can be concentrated to even solid consistency, the roller in the first state of the concentration serving simply as a heating device, the scraper only actively cooperating in the last stage of the concentration in such a manner that the material adhering to the roller is continuously being ground off and removed from the roller.

It is to be noted that the liquid can contain solid particles without the latter influencing the roller in the least.

This apparatus is represented in the accompanying drawings, in which—

Figure 1:
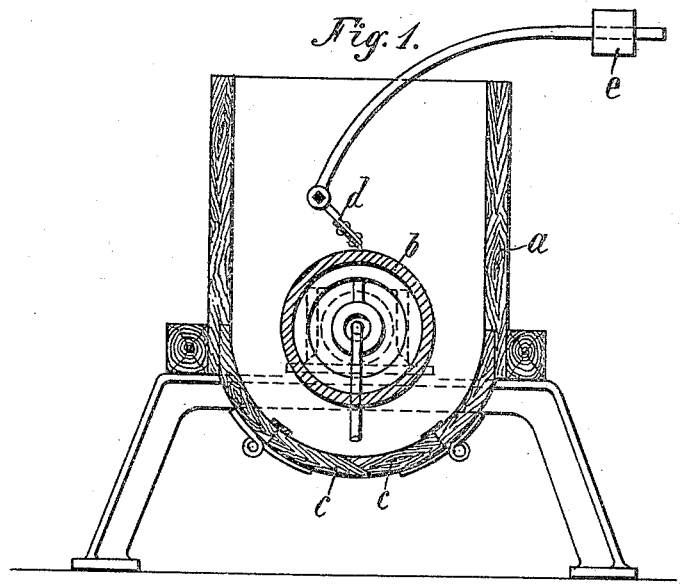
Figure 2:
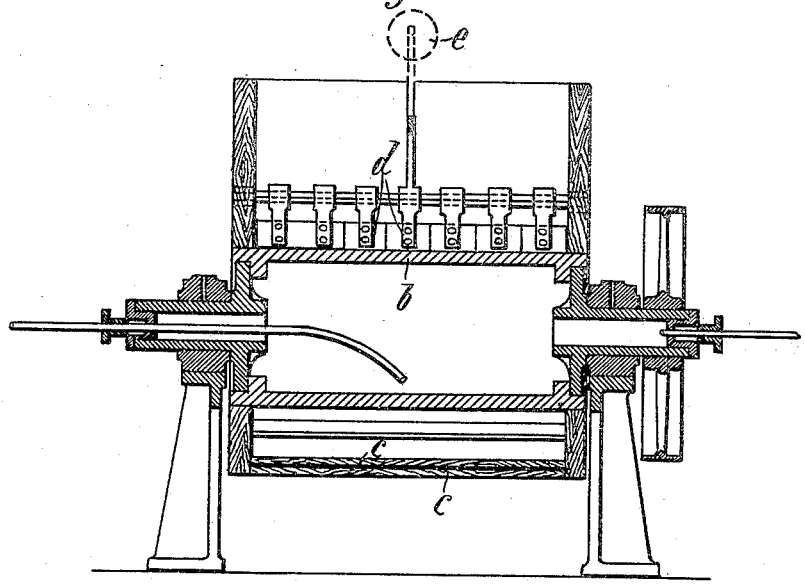

Figure 1 shows a cross-section of the same, and Fig. 2 a longitudinal section of the device.

*a* is a convenient trough or receptacle. In this receptacle is a hollow roller, to which steam is admitted in any known manner and from which the condensed water can be drawn off. The roller preferably extends through the walls of the receptacle, as it has been found that by this arrangement a tight joint between the roller and the walls of the receptacle is attained. The bottom of the receptacle is provided with a door or doors *c* rotatable on hinges, so that the material after having been sufficiently concentrated can be easily and rapidly discharged by opening said doors.

A scraper *d* is arranged in such a manner that it constantly presses or bears against the circumference of the roller *b*—say, for instance, by means of a lever or weight *e*. The scraper consists of a plurality of single plates secured by separate arms to a common cross-shaft mounted in the receptacle *a*, the said arms allowing the material after being concentrated to a rather tough mass to rotate over the scraper.

The apparatus is charged with the liquid to be concentrated and works intermittently, the material being concentrated until it descends to the level of the top of the roller, whereupon the apparatus is discharged in order to be charged with fresh liquid.

Having now particularly described and ascertained my said invention and in what manner the same is to be performed, I declare that what I claim is—

1. In an apparatus for the concentration of liquids the combination with a liquid-containing receptacle, of a single hollow roller mounted therein, the said roller preserving the same diameter throughout its entire length and extending through the walls of the receptacle in such manner that the ends of the roller are in the same vertical plane with the outer face of the receptacle and forming a snug fit therewith, and means for heating the roller, the structure being such that the heating-surface of the roller will extend through the receptacle from end to end, substantially as set forth.

2. An apparatus for concentrating liquids, comprising a liquid-holding receptacle, discharging-doors in the bottom of said receptacle, a hollow rotating roller arranged in the center of the said receptacle, the ends of the said roller fitting closely in apertures formed in the end walls of the receptacle, and means for introducing a heating agency into the hollow roller, the structure being such that all the liquid in the receptacle will be brought into contact with the periphery of the roller only, substantially as described.

3. An apparatus for concentrating liquids, comprising a liquid-containing receptacle, having a semicylindrical bottom, discharging-doors in the said bottom, a single hollow heating-roller mounted with its axis concentric with the curved bottom portion of the liquid-receptacle, means for rotating said hollow roller, and means for scraping substances from the periphery thereof, substantially as described.

4. An apparatus for concentrating liquids consisting of a liquid-holding receptacle, a hollow heating-roller mounted to revolve within said receptacle, means for scraping the periphery of the roller, said means comprising a shaft journaled in the receptacle above the roller, a series of scrapers, each scraper being rigidly secured to the shaft at its upper end, a relatively long arm also secured to said shaft, a weight mounted on said arm, the construction and arrangement being such that the pressure of the scrapers on the roller is regulated by the said arm and weight.

In testimony whereof I have signed my name to this specification in the presence of two subscribing witnesses.

WILHELM VENULETH.

Witnesses:
WALTER HAUSING,
WALTER SCHUMANN.